(12) United States Patent
Wischnewskij et al.

(10) Patent No.: US 7,795,782 B2
(45) Date of Patent: Sep. 14, 2010

(54) MINIATURIZABLE MOTOR

(75) Inventors: Wladimir Wischnewskij, Waldbronn (DE); Alexej Wischnewskij, Woerth (DE)

(73) Assignee: Physik Instrumente (PI) GmbH & Co. KG, Karlsruhe (DE)

( * ) Notice: Subject to any disclaimer, the term of this patent is extended or adjusted under 35 U.S.C. 154(b) by 454 days.

(21) Appl. No.: 11/659,762

(22) PCT Filed: Jun. 29, 2005

(86) PCT No.: PCT/EP2005/006995

§ 371 (c)(1),
(2), (4) Date: Feb. 13, 2008

(87) PCT Pub. No.: WO2006/018062

PCT Pub. Date: Feb. 23, 2006

(65) Prior Publication Data

US 2008/0297001 A1   Dec. 4, 2008

(30) Foreign Application Priority Data

Aug. 13, 2004  (DE) ...................... 10 2004 039 391
Sep. 13, 2004  (DE) ...................... 10 2004 044 184

(51) Int. Cl.
*H02N 2/00* (2006.01)
*H01L 41/09* (2006.01)
*H01L 41/18* (2006.01)

(52) U.S. Cl. .................. 310/323.17; 310/323.01; 310/323.02; 310/323.09; 310/323.11; 310/323.13; 310/330; 310/365; 310/369

(58) Field of Classification Search ...................
310/323.01–323.04, 323.08, 323.09, 323.11, 310/323.13, 323.14, 323.17, 330, 363–366, 310/369

See application file for complete search history.

(56) References Cited

U.S. PATENT DOCUMENTS 2,838,696 A * 6/1958 Thurston ..................... 310/360

(Continued)

FOREIGN PATENT DOCUMENTS

| JP | 63-181010 | * | 7/1988 | ................. 310/330 |
| JP | 2-299477 | * | 12/1990 | ................. 310/358 |
| JP | 3-112374 | * | 5/1991 | ................. 310/366 |
| JP | 4-54877 | * | 2/1992 | ................. 310/369 |

OTHER PUBLICATIONS

Vishnevskyy, et al: "Coupled tangential-axial resonant modes of piezoelectric hollow cylinders and their application in ultrasonic motors", IEEE Transactions on Ultrasonics, Ferroelectrics and Frequency Control. IEEE USA, vol. 52, No. 1, Jan. 2005, pp. 31-36, XP002350772, ISSN: 0885-3010.

(Continued)

*Primary Examiner*—Thomas M Dougherty
(74) *Attorney, Agent, or Firm*—Gerald T. Bodner (57) ABSTRACT

The invention relates to a miniaturizable motor (1) comprising a rotor (12) that is driven by a hollow cylindrical piezo oscillator (2). Said rotor is effectively connected to a frictional face (13) of the piezo oscillator while a main electrode or counter electrode (3) and excitation electrodes (4, 5, 6) are disposed on the surface of the hollow cylinder. The hollow cylindrical piezo oscillator is made of a monocrystalline material with a trigonal crystal system which is provided with three main electrical axes that are placed at a 120° angle relative to each other as well as an optical axis. Said optical axis encloses a 90° angle along with the point of intersection of the electrical axes while coinciding with the longitudinal axis of the hollow cylindrical piezo oscillator. Furthermore, the axial axis of symmetry of the respective excitation electrode intersects one of the main electrical axes while said axial axis of symmetry extends parallel to the optical axis.

11 Claims, 10 Drawing Sheets

U.S. PATENT DOCUMENTS

| | | | |
|---|---|---|---|
| 3,858,065 A | 12/1974 | Epstein | 310/9.5 |
| 4,019,073 A | 4/1977 | Vishnevsky et al. | 310/8.2 |
| 4,087,715 A * | 5/1978 | Myer | 310/317 |
| 4,965,482 A | 10/1990 | Ohnishi et al. | 310/323 |
| 5,323,082 A * | 6/1994 | Wright | 310/328 |
| 5,751,093 A * | 5/1998 | Nakamura | 310/369 |
| 5,872,418 A | 2/1999 | Wischnewskiy et al. | 310/323 |
| 2005/0017603 A1 * | 1/2005 | Ma et al. | 310/369 |

OTHER PUBLICATIONS

Koc, et al: "A Piezoelectric Motor Using Two Orthogonal Bending Modes of a Hollow Cylinder", IEEE Transactions on Ultrasonics, Ferroelectrics and Frequency Control. IEEE USA, vol. 49, No. 4, Apr. 2002, pp. 495-500.

\* cited by examiner

MINIATURIZABLE MOTOR

The invention relates to a miniaturisable motor with a rotor which is driven by a hollow cylindrical piezo oscillatator, with the rotor being effectively connected with a face-side friction surface of the piezo oscillatator, and with a main electrode or counter electrode as well as excitation electrodes being arranged at the surface of the hollow cylinder, in accordance with the preamble clause of Claim 1.

Piezo motors or ultrasound motors, respectively, with composite oscillators which are connected by special screws, e. g. according to U.S. Pat. No. 4,965,482, belong to the state of the art. The construction of such motors is complicated and requires high technologically expenditures so that this constitutes an obstacle for the desired miniaturisation.

The state of the art further includes piezoelectric ultrasound micro motors with a metallic cylindrical oscillator to which plate-shaped piezo elements are adhesively attached. Such motor constructions are disadvantageous in that the adhesive which joins the piezo elements and the resonator will be softened during operation. This in turn leads to a decrease of the excitation level of the oscillator and consequently to a reduction in the mechanical power. Because of these drawbacks, such motors cannot be operated with the maximum possible excitation amplitudes. This in turn entails a reduction in reliability and limited application possibilities with respect to actually produced motors. As an example, reference is made to the publication in IEEE Trans. Ultrason., Ferroelect., Freq. Contr., Vol. 49, pages 495 to 500, April 2002.

In the piezoelectric ultrasound motor according to U.S. Pat. No. 5,872,418 the oscillator in its entirety consists of a piezoceramic material. A disadvantage of such an embodiment is the high brittleness of the piezoceramic material with small diameters of the actual piezo oscillator. These motors from the state of the art cannot be manufactured smaller than with a diameter of 3 mm. Another problem is to protect the friction surface of the oscillator, which has only a small size against inevitable wear. Already with oscillators of a diameter of <6 mm considerable technological problems are encountered when applying metallic layers or glass layers on the friction surface, which leads to higher manufacturing costs. If a coating of the friction surface is dispensed with, the life of the motors is shortened accordingly.

Based on the above it is therefore the object of the invention to specify a miniaturisable motor with a rotor which is driven by a hollow cylindrical piezo oscillatator, with the rotor being effectively connected with a face-side friction surface of the piezo oscillatator, which may be economically produced by a simple manufacturing technology, also in high quantities, and with the life and long-term stability of such motors meeting the practical requirement.

The object of the invention is solved with a miniaturisable motor according to the characteristics of Claim 1, with the dependent claims representing at least useful embodiments and advancements.

Therefore, the basic idea of the invention is to specify a miniaturisable piezoelectric motor with a cylindrical oscillator, with the oscillator being made from a piezoelectric monocrystal with a special crystallographic orientation or consisting of such a material, respectively.

When such a piezoelectric monocrystal is employed, the necessary excitation for the motor's function is possible, on the one hand, by a special arrangement of the electrodes relative to the crystal axes, while due to the high hardness of the monocrystal, on the other hand, a minimum wear results in the area of the friction surfaces for driving the rotor.

In concrete terms, the preferred hollow cylindrical piezo oscillator to be employed consists of a monocrystalline material with a trigonal crystal system. A crystal is then referred to as trigonal when is has a 3-fold axis of rotation. The material which is employed, with a trigonal crystal system has three electrical main axes arranged at an angle of 120° to each other and an optical axis which includes an angle of essentially 90° with the point of intersection of the electrical axes and which coincides with the longitudinal axis of the hollow cylindrical piezo oscillator.

The axial axis of symmetry of the respective excitation electrode or excitation electrode surface, respectively, intersects with one of the three electrical main axes, with the respective axial axis of symmetry extending parallel to the optical axis.

The excitation electrodes of the piezo oscillator are arranged equally spaced at the outer cylinder jacket of the hollow cylinder, with the common main electrode being disposed on the inner jacket of the hollow cylinder.

Thus, the principal embodiment of the miniaturisable motor is based on an oscillator in the shape of a monolithic piezoelectric hollow cylinder which at least at one face is in friction contact with a rotor pressed against said face and which has a common main electrode and three excitation electrodes which are arranged on the surface of the cylinder jacket of the oscillator, i. e. of the hollow cylinder.

In a first embodiment of the inventive motor each excitation electrode excites the first bending mode. The oscillator thereby oscillates in a plane which is formed by the optical axis as well as the electrical axis which corresponds to the respective excitation electrode.

In a second embodiment of the motor, the first tangential-axial oscillation mode is excited by each excitation electrode in the hollow cylindrical oscillator.

A third embodiment of the motor is characterised in that a standing longitudinal wave, i. e. an elongation wave, is excited on the cylinder circumference.

The invention will be explained in more detail in the following with reference to an exemplary embodiment and with the aid of figures; in which.

The preferred embodiment of the motor according to the exemplary embodiment which will be described in more detail in the following is based on a monolithic piezoelectric hollow cylinder which at least at one face is in friction contact with a rotor pressed against said face. The piezoelectric hollow cylinder comprises a common main electrode at the inner surface of the cylinder and three excitation electrodes on the outer surface of the cylinder jacket.

Figure 4:
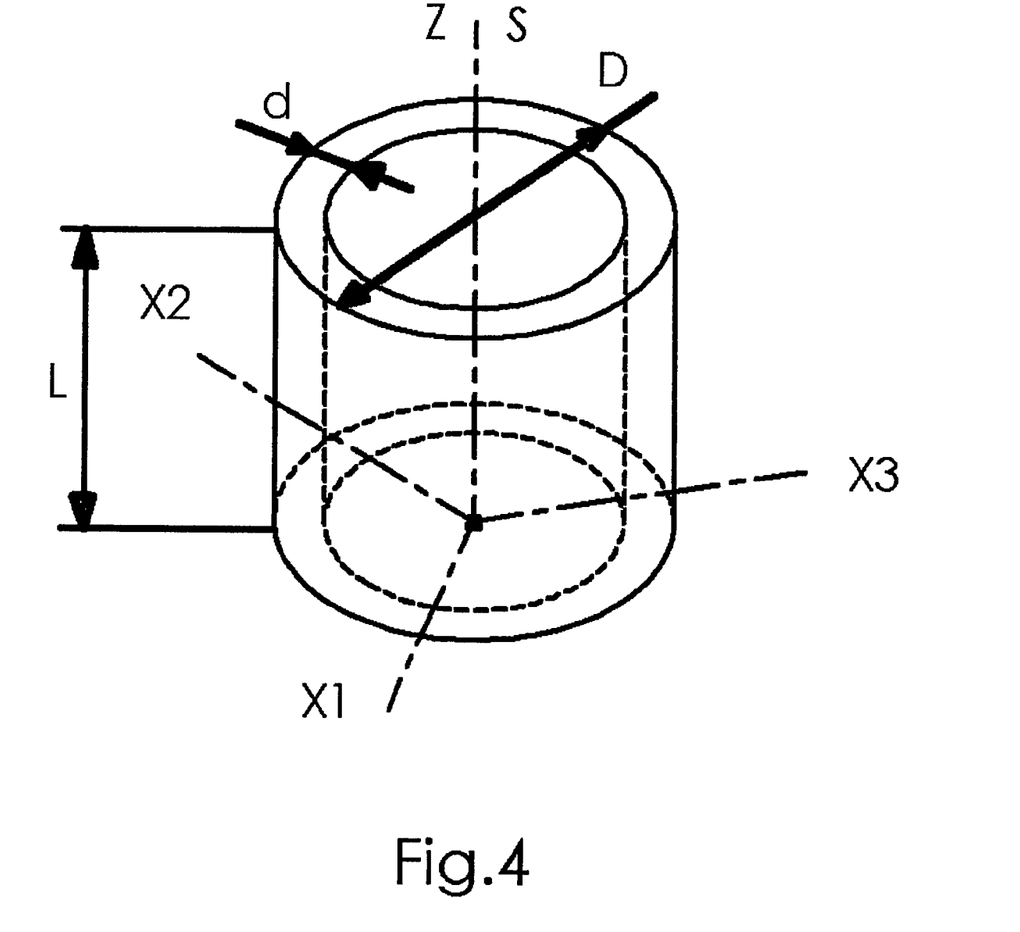
FIG. 4 shows orientations of the piezo element of the driving oscillator relative to the defined crystal axes.
Figure 6:
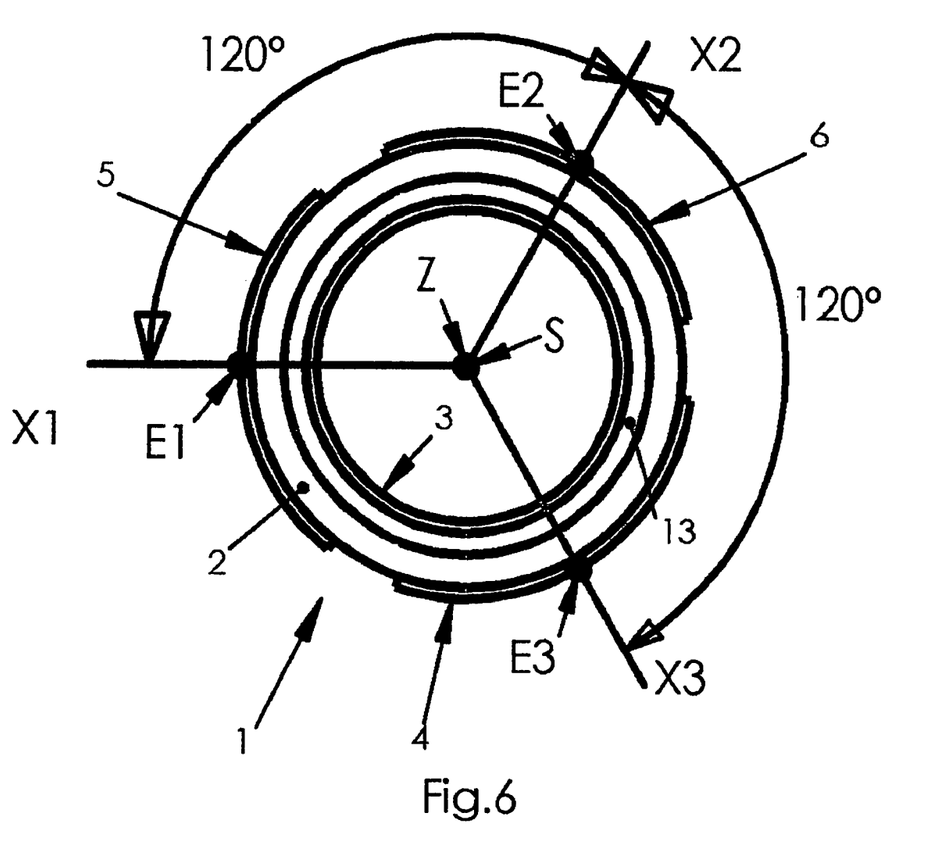
FIG. 6 shows a face-side view of the hollow cylindrical piezo oscillator.

The piezo oscillator consists of a piezoelectric monocrystal with a trigonal crystal system. Such a piezoelectric monocrystal with trigonal crystal system has three electrical main axes as well as one optical axis. The electrical axes are arranged at an angle of 120° to each other. With reference to FIGS. 4 and 6, they form an angle of 90° with the optical axis. The piezoelectric crystal is so oriented that the optical axis coincides with the longitudinal axis of the cylindrical oscillator. The arrangement of the three excitation electrodes is selected in such a manner that the axial axis of symmetry of each electrode intersects with one of the electrical main axes of the monocrystal, while simultaneously extending parallel to the optical axis of the monocrystal.

Figure 1:
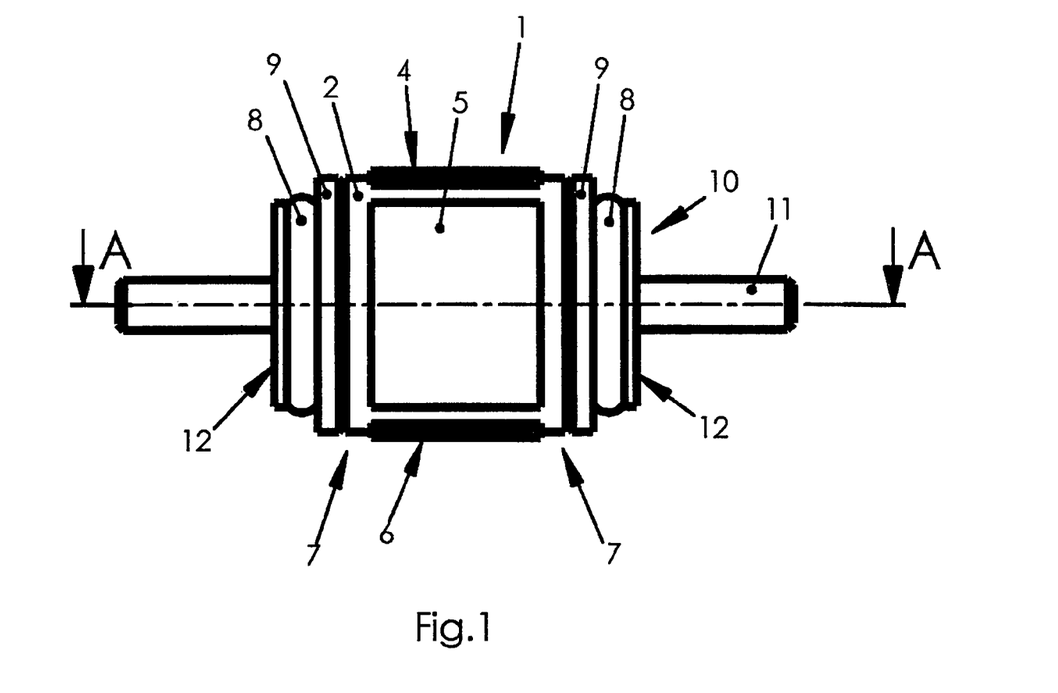
FIG. 1 is a principal illustration of the motor in a side view.
Figure 2:
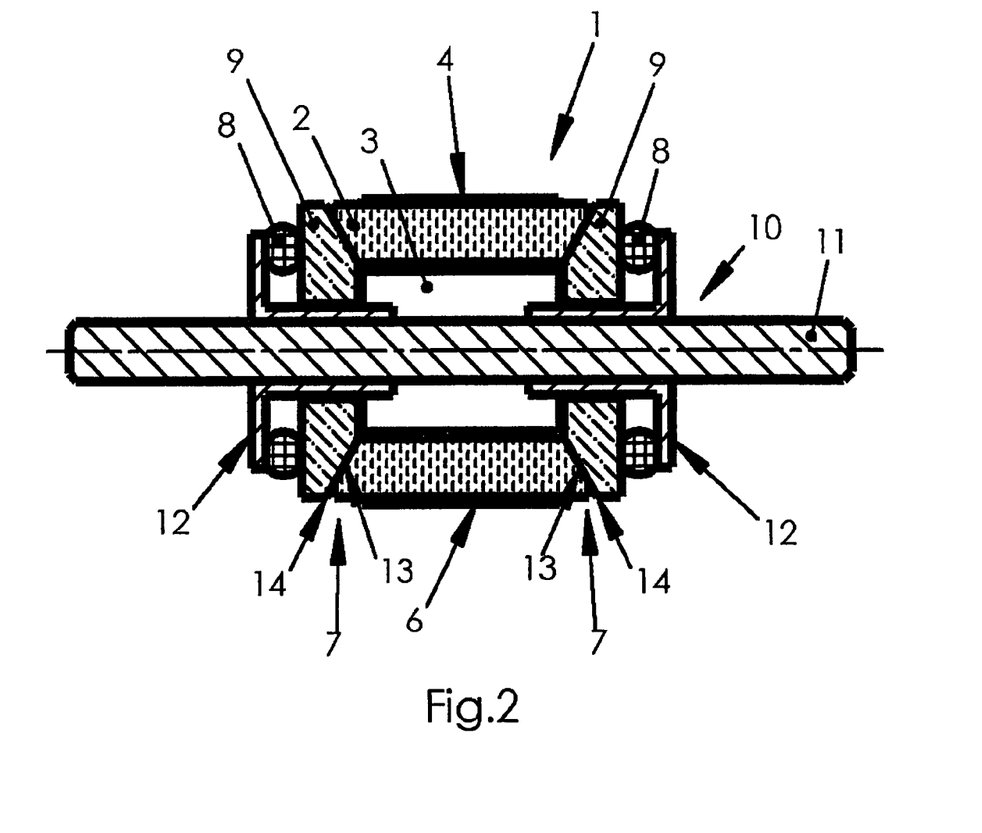
FIG. 2 shows a sectional view of the inventive motor with hollow cylindrical oscillator.

The miniaturisable motor according to FIGS. 1 and 2 comprises an oscillator 1 which is configured as a monolithic piezoelectric hollow cylindrical piezo element 2.

The common main electrode 3 is disposed on the inner cylinder jacket of the piezoelectric element 2.

The outer cylinder jacket accommodates the three excitation electrodes 4, 5, and 6. Eight friction disks 9 as components of the rotor 12 are pressed against two opposing faces 7 of the oscillator 1 by means of elastic elements 8. The friction disks 9 are secured at the rotor shaft 11 by means of a sleeve arrangement 12.

In order to ensure an adequate friction contact, the oscillator 1 is provided with two conical friction surfaces 13. Correspondingly complementary conical surfaces 14 are formed at the friction disks 9, these being in contact with the conical surfaces 13 of the oscillator 1.

The friction disks 9 are preferably made from a wear-resistant material, e. g. of aluminium oxide, zirconium oxide, silicon nitride, silicon carbide, or similar materials.

The elastic elements 8 may be made as rings from a silicone rubber material or from a similar material. It is also conceivable to design the elastic elements 8 as flat plate springs.

The piezo elements 2 is made from a piezoelectric monocrystal with trigonal crystal system, e. g. from crystalline quartz ($SiO_2$), lithium niobate ($LiNbO_3$), lithium tantalate ($LiTaO_3$), langasite ($La_3Ga_5SiO_{14}$) or similar materials.

Figure 3:
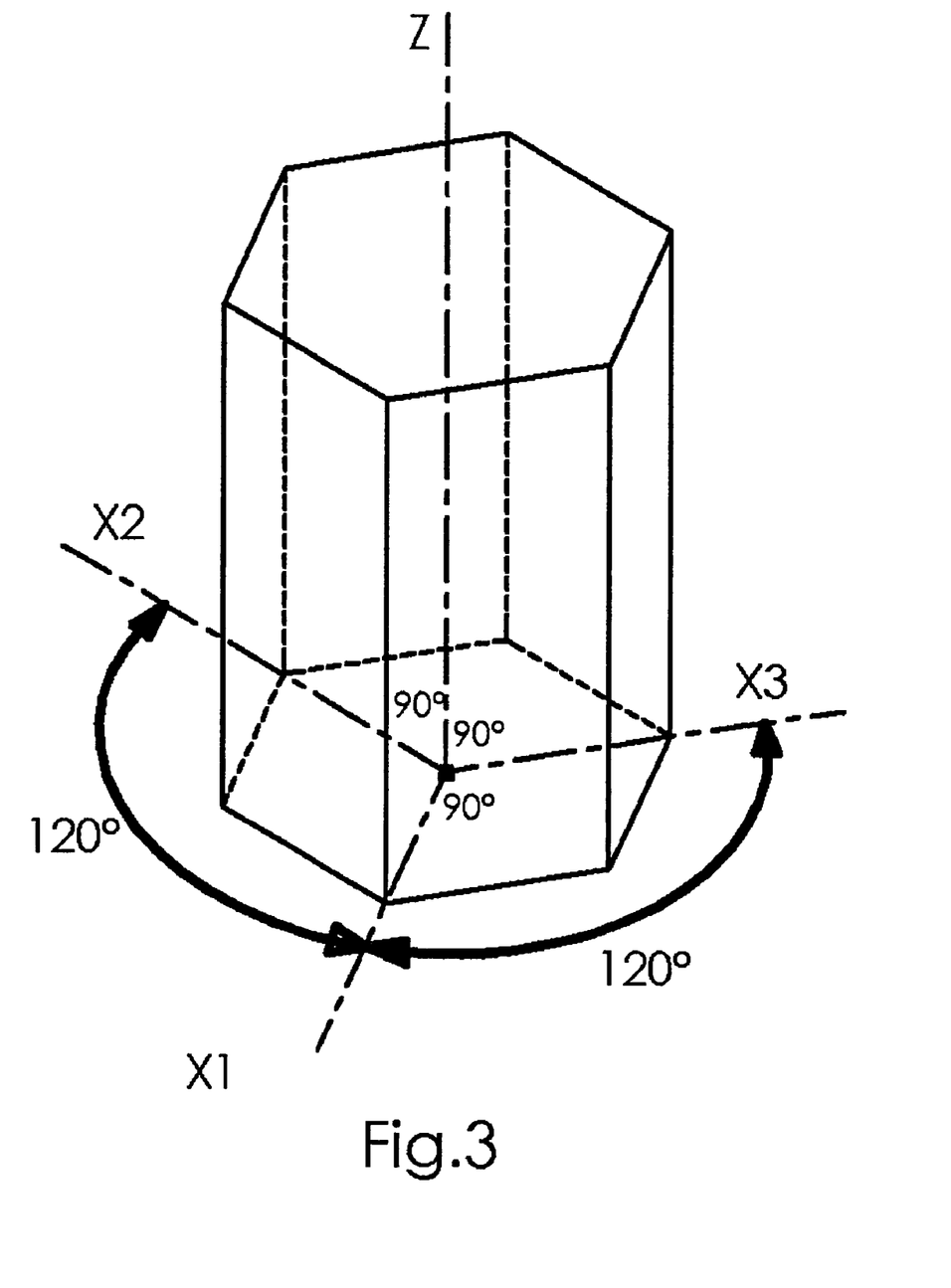
FIG. 3 is a schematic illustration of a piezoelectric crystal with a trigonal crystal system in rhombohedric shape.

Crystals with such a crystal system have one optical axis Z as well as three equivalent electrical main axes X1, X2, and X3 which are arranged under an angle of 120° to one another and which include an angle of 90° with the optical axis. Reference is made to the schematic illustration of such a trigonal crystal system according to FIG. 3.

The optical crystal axis Z refers to the crystal direction where there is no inverse piezoelectric effect or which only when compared with other crystallographic orientations manifests itself very weakly.

The electric axis refers to the crystal direction where the inverse piezoelectric effect has a maximum value.

As can be seen from the figures, the piezo element 2 of the miniaturisable motor is made as a hollow cylinder from the mentioned crystal material, with the orientation of the cylinder relative to the crystal axes Z, X1, X2, and X3 being shown in FIG. 4. It is of importance that the axial axis S of the piezo element 2 or of the oscillator 1, respectively, coincides with the optical axis Z of the monocrystal.

Figure 5:
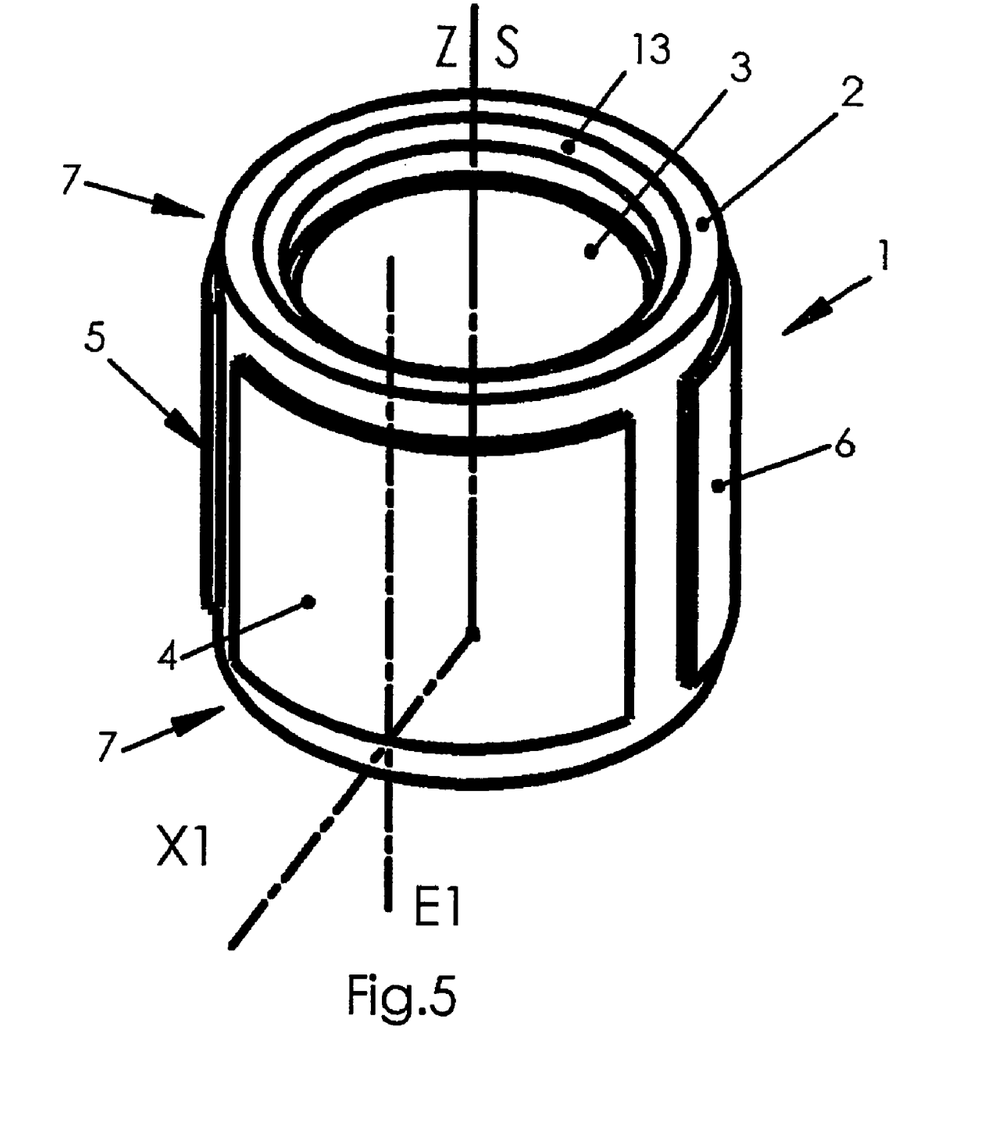
FIG. 5 shows the arrangement of the electrodes on the hollow cylindrical piezo oscillator.

The electrodes 3, 4, 5, and 6 are made as thin metal layers which are applied to the cylinder jacket of the hollow cylindrical oscillator according to FIGS. 2, 5, and 6.

A completely metallised inner jacket surface of the piezo element 2 serves as the common main electrode 3 of the oscillator 1.

The excitation electrodes 4, 5, and 6 are formed as metallised sectors of the outer jacket surface of the piezo element 2, with their relative spatial positions being under an angle of 120° each.

The axial axes of symmetry E1, E2, and E3 of each excitation electrode intersect with the corresponding electrical main axis X1, X2, or X3 of the piezoelectric monocrystal and extend parallel to the optical axis Z as illustrated in FIG. 6 for the axes E1, E2.

Figure 7:
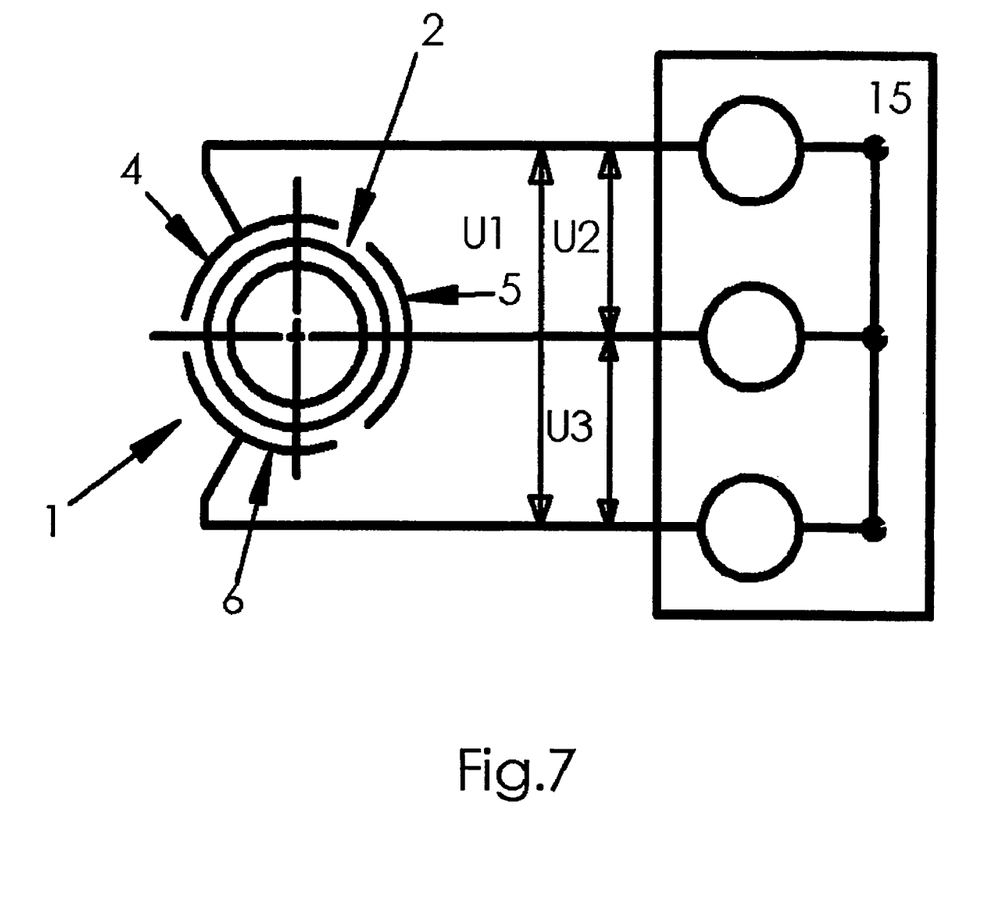
FIG. 7 shows an exemplary circuitry of the oscillator with an electrical excitation source.

FIG. 7 shows a principal electrical circuitry of the inventive miniaturisable piezo motor with a 3-phase electrical excitation source 15 and the phase-shifted voltages U1, U2, and U3 resulting therefrom.

Figure 8:
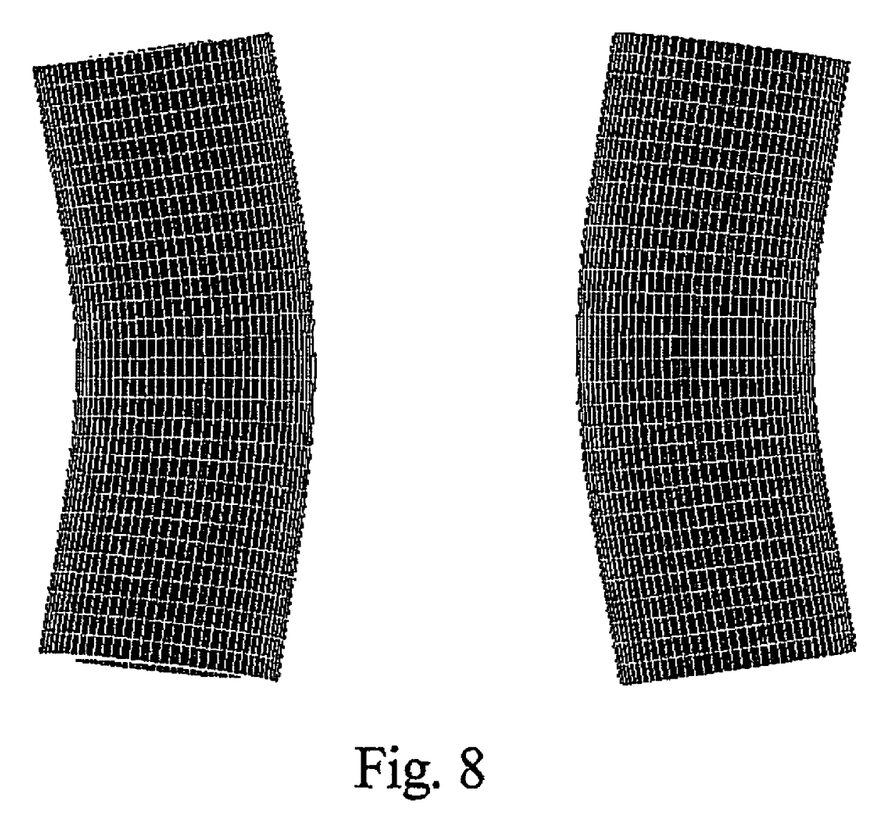
FIG. 8 illustrates the oscillator vibrations upon the excitation of the bending mode.

FIG. 8 symbolises two vibration phases of the oscillator during the excitation of the bending mode by means of one of the excitation electrodes.

Figure 9:
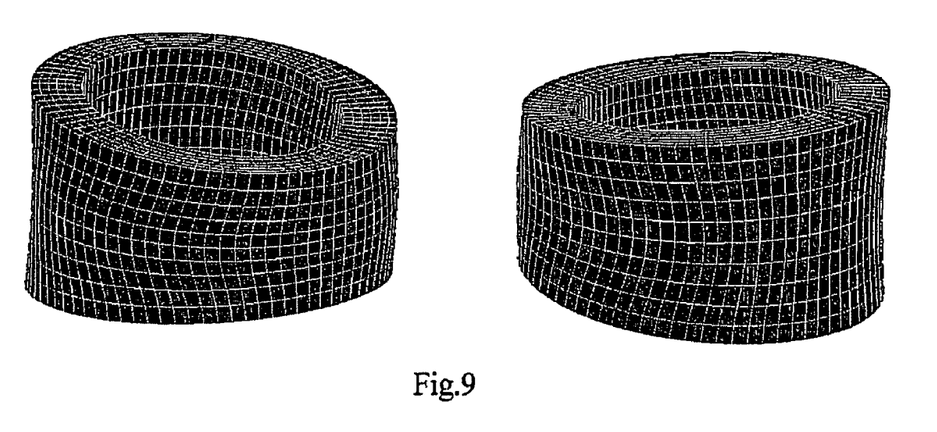
FIG. 9 illustrates the oscillator vibrations upon the excitation of the tangential-axial mode.
Figure 10:
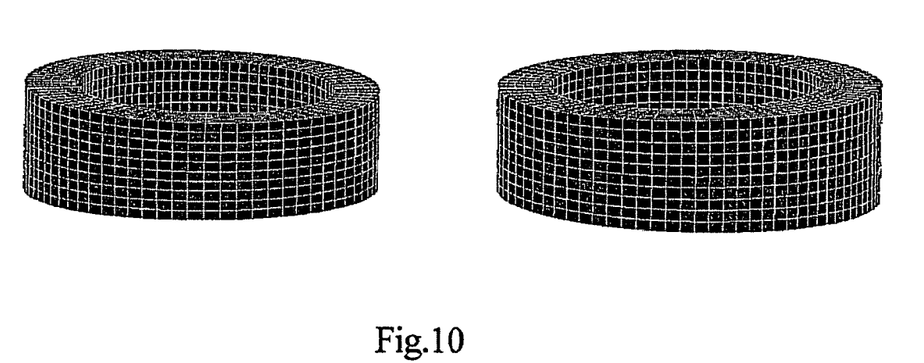
FIG. 10 illustrates the oscillator vibrations upon the excitation of the longitudinal wave on the circumference of the hollow cylinder.

Vibration phases of the oscillator upon the excitation of the tangential-axial vibration mode by means of one of the excitation electrodes are shown in FIG. 9, while FIG. 10 symbolises two vibration phases of the oscillator which are generated upon the excitation of longitudinal waves on the circumference of the cylinder by means of one of the excitation electrodes.

The above described miniaturisable motor represents a 3-phase travelling wave motor, with the travelling wave being generated by the superposition of three standing waves.

Three types of standing waves may be utilised for operating the presented motor. First, the bending mode, i. e. the $\lambda/2$ bend of the cylinder along its longitudinal axis. This mode induces vibrations of the oscillator in the optical axis Z as well as in the electrical axis X which corresponds to the controlled electrode (FIG. 8).

Likewise, an operation via the excitation of the first tangential-axial vibration mode according to FIG. 9 or by means of a longitudinal wave on the circumference of the cylinder as a multiple of the wavelength $\lambda$ is possible.

The site of the standing wave which is excited in the oscillator is determined by the ratio height H of the oscillator to diameter D of the oscillator. For the excitation of the first bending mode, this ratio amounts to e. g. 4, for the excitation of the first tangential-axial mode it amounts to 0.9, and 0.5 for the excitation of a longitudinal wave on the circumference of the cylinder. In the above described cases, the wall thickness of the cylinder amounts approx. to D/6.

As explained, the function principle of the motor is based on the excitation of a travelling wave in the oscillator. As a result of this excitation, points of the faces of the oscillator move along elliptical paths. The travelling wave is generated here as the result of a superposition of three standing waves with identical amplitudes, with the spatial shift of the standing waves relative to one another amounting to $\lambda/3$ and their time shift amounting to 120°. Each of these three standing waves is generated by one of the excitation electrodes 4, 5, or 6. The amplitude equality of the standing waves is due to the orientation of the monocrystal with respect to the excitation electrodes 4, 5, and 6.

For the simultaneous excitation of three standing waves, the oscillator is connected to a 3-phase electrical power source 15 (FIG. 7) with a 120° phase difference between the phases.

Each phase excites a standing wave in the oscillator which is independent of the two other phases, the type of which is determined by the ratio H/D. As a result of such a superposition, a travelling wave is generated in the oscillator by the three standing waves, so that the points of the friction surfaces 13 of the oscillator 1 move through the above mentioned elliptical paths.

The friction disks 9 which are urged against the oscillator 1 are thereby imparted a rotational motion which is transferred to the rotor shaft 11 via the force-transmitting elastic elements 8.

For the purpose of achieving the desired small overall dimensions of the motor, the motor is manufactured without a housing supporting the oscillator 1. The attachment of the motor is effected e. g. by adhesively bonding or soldering it to an outer electrode.

As has been explained, the miniaturisable motor according to the invention is manufactured from a very hard monocrystal. Such a monocrystalline oscillator has a very high strength and enables the production with small dimensions. In variants of the embodiments of realised motors, the oscillator may have a diameter of less than 1 mm. The manufacture of a monocrystal-line oscillator is carried out according to adequately controlled manufacturing technologies, of e. g. of quartz resonators.

The friction surface of the presented monocrystalline oscillator does not require any special abrasion-resistant protective coating, because the hardness of the monocrystal is already extraordinarily high and therefore provides the desired wear resistance. Moreover, the wear of the friction surface in such an oscillator takes place towards the optical axis, i. e. in the direction of the highest hardness, which additionally increases the reliability and life of the motor.

LIST OF REFERENCE NUMERALS

1 Oscillator
2 Piezo element
3 Common main electrode
4 Excitation electrode
5 Excitation electrode
6 Excitation electrode
7 Face of the oscillator
8 Elastic element
9 Friction disk
10 Rotor
11 Shaft
12 Sleeve
13 Friction surface of the oscillator
14 Friction surface of the disk 9
15 Three-phase electrical power source

The invention claimed is:

1. A miniaturizable motor with a rotor which is driven by a hollow cylindrical piezo oscillator, with the rotor being effectively connected with a face-side friction surface of the piezo oscillator and with a main electrode or counter electrode as well as excitation electrodes being arranged at the surface of the hollow cylinder,
characterised in that
the hollow cylindrical piezo oscillator consists of a monocrystalline material with a trigonal crystal system which has three electrical main axes arranged at an angle of 120° to each other and one optical axis which includes an angle of 90° with the plane defined by the electrical axes and which coincides with the longitudinal axis of the hollow cylindrical piezo oscillator, and further that the axial axes of symmetry of the respective excitation electrode intersects with one of the three electrical main axes, with the respective axial axis of symmetry extending parallel to the optical axis.

2. The miniaturizable motor according to claim 1,
characterised in that
the excitation electrodes are arranged equally spaced on the outer jacket of the hollow cylinder.

3. The miniaturizable motor according to claim 1,
characterised in that
the common main electrode is disposed on the inner jacket of the hollow cylinder.

4. The miniaturizable motor according to claim 1,
characterised in that
a conical friction surface each is formed at the faces of the hollow cylinder, which cooperates with a complementary cone of the friction disk for driving the rotor.

5. The miniaturizable motor according to claim 1,
characterised in that
the first bending mode of the oscillator is excited by each excitation electrode, with the piezo oscillator oscillating in a plane which is formed by the optical axis as well as the electrical axis corresponding to the respective excitation electrode.

6. The miniaturizable motor according to claim 1,
characterised in that
the first tangential-axial vibration mode is excited in the piezo oscillator by each excitation electrode.

7. The miniaturizable motor according to claim 1,
characterised in that
a standing longitudinal wave is excited in the piezo oscillator on the circumference of the hollow cylinder by each excitation electrode.

8. The miniaturizable motor according to claim 2,
characterised in that
the common main electrode is disposed on the inner jacket of the hollow cylinder.

9. The miniaturizable motor according to claim 8,
characterised in that
a conical friction surface each is formed at the faces of the hollow cylinder, which cooperates with a complementary cone of the friction disk for driving the rotor.

10. The miniaturizable motor according to claim 2,
characterised in that
a conical friction surface each is formed at the faces of the hollow cylinder, which cooperates with a complementary cone of the friction disk for driving the rotor.

11. The miniaturizable motor according to claim 3,
characterised in that
a conical friction surface each is formed at the faces of the hollow cylinder, which cooperates with a complementary cone of the friction disk for driving the rotor.

* * * * *